Patented June 1, 1926.

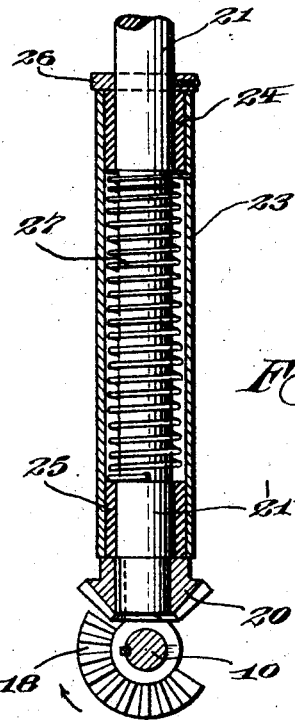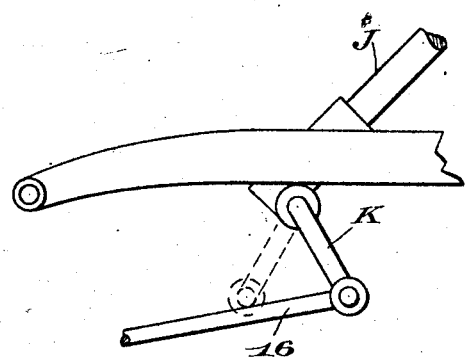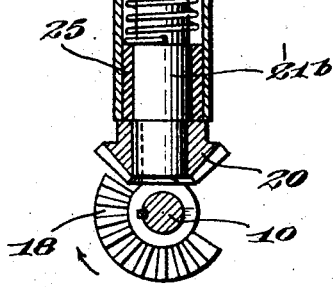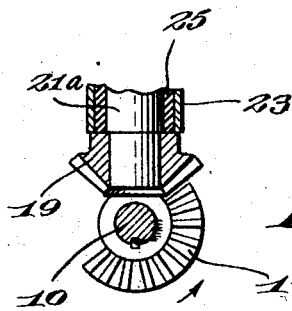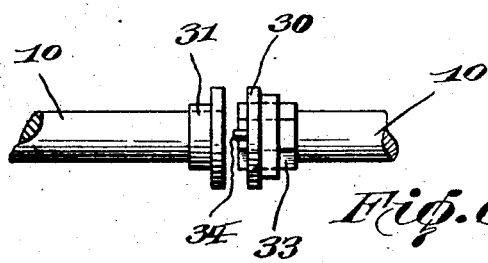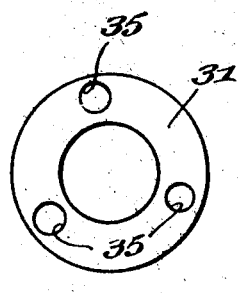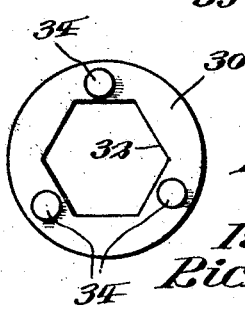

1,586,578

UNITED STATES PATENT OFFICE.

ISAAC D. ROBERTSON, OF NEW YORK, N. Y., AND RICHARD H. ROBERTSON, OF CHARLESTON, SOUTH CAROLINA.

HEADLIGHT.

Application filed August 28, 1925. Serial No. 53,048.

This invention relates to headlights for use in connection with motor vehicles, said headlights being automatic in their action and operation.

An important object of the invention resides in the provision of means whereby the lights will be positively under the control of any change in the direction of the vehicle, that is, right or left hand turns.

Another object of the invention is to provide means whereby each light may be turned independent of its companion light.

A still further object is the adaptation of means for rendering the light-turning mechanism inoperative at will.

The invention further consists in the features and combination and arrangement of parts hereinafter described and particularly pointed out in the claims.

In the drawings accompanying this specification:—

Fig. 3 is a vertical longitudinal section taken on the line 3—3 of Fig. 1. While this view shows the assemblage of certain light-supporting means, it further illustrates the cooperating bevel gears.

Fig. 4 is a sectional detail illustrating the position of another pair of gears located adjacent the right-hand light as viewed in Fig. 1.

Fig. 5 is an elevation, with parts broken away, showing the connection of an operating rod with the steering mechanism of a vehicle.

Fig. 6 is an elevation of certain clutch elements; and

Figs. 7 and 8 are details thereof.

In carrying out our invention we provide lights A and B, positioned adjacent the automobile radiator C, and adapt each light to assume the same angle as its adjacent wheel D and E respectively. The latter are connected, of course, by the usual front axle F.

Figure 2:
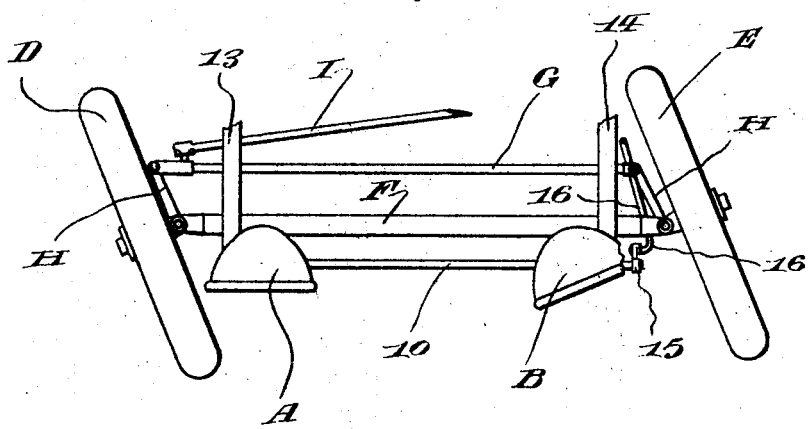
Fig. 2 is a plan view of a portion of the mechanism depicting a light turned at the same angle as its adjacent front wheel of the vehicle.

The mechanism operating the front wheels D and E is clearly shown in Fig. 2, and comprises the rod G operatively connected at its ends by arms H to said wheels. The rod I has one end connected by ball-and-socket means to one end of said rod G, while its other end is connected to the steering mechanism K positioned below the steering column J (see Fig. 5).

The above comprises the general assemblage of this particular part of a motor-vehicle and as they are very well-known by those skilled in this art, a further detailed description or illustration is deemed unnecessary.

Passing now to the detailed description of our invention proper, the numeral 10 denotes a rotatable shaft extending transverse of the front of a motor vehicle, just above and in front of the axle F. Both ends of said shaft are journalled in bearings 11 and 12 secured to the lower flanges of the channel-members 13 and 14. Said shaft 10 is operated by the steering mechanism J (see Fig. 5) and interposed between the two elements is a crank 15 and a rod 16, the latter having one end provided with a ball to engage a socketed portion in said crank 15, while its other end is secured to the arm of the steering mechanism K. Figures 2 and 5 should be considered for a clear understanding of the above.

It is manifest that when the vehicle is making a left-hand turn the arm of the steering mechanism K turns rearwardly of the machine, thus drawing the rod 16 in a similar direction and rotating said shaft counter-clockwise. When the vehicle makes a right-hand turn the arm of the steering mechanism rotates forwardly and exerts a push on said rod 16, thereby rotating said shaft 10 in the reverse direction hereinbefore set forth.

As is now quite apparent I use this rotative motion imparted to said shaft 10 to independently operate the lights or lamps A and B, and in order that one kind of rotation may be communicated to the proper lamp and the other kind of rotation to its companion lamp, each independent of the other, I spline the segmental gear 17 on said shaft 10 and a similar gear 18 at the other extremity. Each of these gears are adapted to mesh with the bevel gears 19 and 20 respectively, mounted on the lower end of the lamp brackets 21. The particular mounting of said segmental gears 17 and 18 will be clearly understood upon inspection of Figs. 3 and 4 and is also the position assumed when the vehicle is travelling in a straight line. The gears are also in this position in Fig. 1.

Thus when the machine is making a left-hand turn, as shown in Fig. 2, the rearward pull on the rod 16 rotates said gear 17 in the direction of the arrow (Fig. 4) which motion is communicated to the shaft 21ᵃ of the bracket 21, thus rotating the lamp B in conjunction with the front wheel E. Similarly, when a right-hand turn is being made the forward push exerted on the rod 16 rotates the gear 18 in the direction of the arrow (Fig. 3) which meshes with gear 20 and also imparts rotative motion to the shaft 21ᵇ of the bracket 21. The lamp A now assumes the same angularity as the other front wheel D. It should be noted that each particular rotation imparted to the gears 17 and 18, serves to rotate the other free from its companion gear, so that, in other words, one gear is inoperative while the other is operative.

Each lamp is provided with an improved bracket 21, the lower end, or shaft portions thereof (21ᵃ and 21ᵇ) are adapted to be housed within a tubular casing 23, which is provided with bushings 24 and 25 adjacent its extremities. The lower ends of the shafts 21ᵃ and 21ᵇ are reduced in diameter for the reception of bevel gears 19 and 20 as previously described. A thrust collar 26 encircles the shafts and thus firmly holds the casing 23 in position between itself and the hubs on the bevel gears. Intermediate the bushings 24 and 25, said shafts 21ᵃ and 21ᵇ are reduced in diameter and encircled therearound are coiled springs 27, the upper end thereof being secured to said casing 23, while its other end is fastened to the shaft. This spring absorbs any undue vibrations of the lamps and materially assists in gently returning the lamps to their original positions at the termination of the turn.

Figure 1:
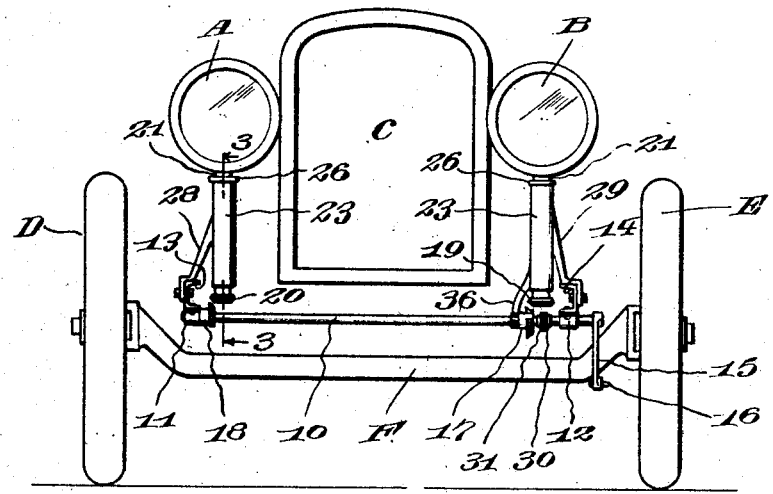
Figure 1 is an elevation of my invention as viewed from the front of a motor vehicle. The parts of the motor vehicle are shown somewhat diagrammatically, but such showing is believed ample to illustrate the assemblage.

Each of the lamps are provided with the above described mechanism and in mounting the same to the machine we have provided depending angular brackets 28 and 29, which engage the channel-members 13 and 14 respectively, as clearly shown in Fig. 1.

In order to remove the influence of the turning of the wheels on the lamps, we have adopted a simple clutch mechanism as shown in Fig. 6, which may be operated from the driver's seat by any well-known clutch-operating mechanism.

Said clutch mechanism comprises male and female members 30 and 31 respectively, the latter being fixed to said shaft 10, while the former is provided with an hexagonal opening 32, adapted to ride over the hexagonal head 33 on the end of said shaft 10. The member 30 is provided with pins 34, which are adapted to register with the aligned openings 35 in said member 31. The clutch-actuating mechanism will slide the member 30 upon the hexagonal head 33 and effect engagement or disengagement as desired.

In order to support the shaft 10 when disengagement is effected we support the same in a hanger 36 depending from the casing 23.

Thus we have disclosed a combination of elements designed to automatically operate automobile headlights, which will turn the right lamp at the same angle as the right front wheel and also turn the left lamp at the same angle as the left front wheel, when said vehicle is making turns to the right and left respectively.

We claim:—

1. The combination of a motor vehicle having steering means, a pair of spaced headlights, a pair of vertical shafts connected to said headlights, a transverse shaft supported beneath said vertical shafts, means for connecting said shaft to said steering means, a pair of beveled gears carried at the lower ends of said vertical shafts and segmental gears carried by said transverse shaft, each being adapted to engage its companion beveled gear, and turn the headlight in the direction of the changed position of the vehicle.

2. The combination of a motor vehicle having steering means, a pair of spaced headlights, a pair of vertical shafts connected to said headlights, casings for said shafts, a transverse shaft positioned at the lower ends of said vertical shafts, means for connecting said transverse shaft to said steering means, a pair of beveled gears carried at the lower ends of said vertical shafts, segmental gears carried by said transverse shaft, each being adapted to engage its companion beveled gear and turn the headlight in the direction of the changed position of the vehicle and resilient means encircling said vertical shafts within said casing for facilitating the return of said headlights to their original positions.

In testimony whereof we affix our signatures.

ISAAC D. ROBERTSON.
RICHARD H. ROBERTSON.